United States Patent
Lin et al.

(10) Patent No.: US 8,279,945 B2
(45) Date of Patent: Oct. 2, 2012

(54) METHOD FOR COMPENSATING TIMING MISMATCH IN A/V DATA STREAM

(75) Inventors: Chi-Chun Lin, Tainan County (TW); Shih-Rong Kao, Hsinchu (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 1282 days.

(21) Appl. No.: 12/020,593

(22) Filed: Jan. 28, 2008

(65) Prior Publication Data

US 2009/0190670 A1    Jul. 30, 2009

(51) Int. Cl.
*H04B 1/66* (2006.01)
(52) U.S. Cl. .................. 375/240.27; 370/503; 370/509; 370/510; 375/240.26
(58) Field of Classification Search .......................... None
See application file for complete search history.

(56) References Cited

U.S. PATENT DOCUMENTS

| | | | |
|---|---|---|---|
| 6,212,208 B1* | 4/2001 | Yoneda et al. | 370/538 |
| 2003/0161538 A1* | 8/2003 | Chiba | 382/233 |
| 2004/0258151 A1* | 12/2004 | Spampinato | 375/240.03 |
| 2005/0071724 A1* | 3/2005 | Blacquiere et al. | 714/755 |
| 2006/0013318 A1* | 1/2006 | Webb et al. | 375/240.25 |
| 2006/0159191 A1* | 7/2006 | Weinholt et al. | 375/261 |

\* cited by examiner

*Primary Examiner* — Donald Mills
(74) *Attorney, Agent, or Firm* — Winston Hsu; Scott Margo

(57) ABSTRACT

Methods for compensating timing errors in an A/V stream are provided. An embodiment of the methods includes: receiving a plurality of encoded video frames of a current Group of pictures (GOP) from the video encoder and a plurality of encoded audio frames; when an error occurs in the video encoder, utilizing a most recent encoded video frame of a previous GOP received from the video encoder as a reference to generate a plurality of dummy video frames; and utilizing the dummy video frames to pad the current GOP.

11 Claims, 2 Drawing Sheets

METHOD FOR COMPENSATING TIMING MISMATCH IN A/V DATA STREAM

BACKGROUND

Digital systems encode data streams to reduce the amount of data that needs to be sent over a network. Encoding can also protect data from being illegally accessed.

When encoding audio-visual data, a separate video encoder and audio encoder are utilized, and the separately encoded data streams then need to be multiplexed together by a multiplexer. Timing of the streams is therefore very important. If some error occurs in the timing, there will be a discrepancy between the sound and the picture as seen by a viewer.

The timing mismatch can occur for a number of reasons. Occasionally, a video encoder will abort during encoding, for example due to processing of bad data. The video encoder then needs to be restarted, however, encoded audio frames are still being continuously received by the multiplexer during this restarting period. As no video frames exist to be multiplexed with the incoming audio frames, a timing mismatch will occur and accumulate over time.

In another example, when a data source system changes, the video encoder encodes at a lower frame rate than expected. The actual time a video frame arrives will therefore be later than the expected time the video frame should arrive. Although the initial error is small, over time the error will accumulate and eventually become obvious to a viewer.

In a last example, the signal source is unstable. In this case the video encoder will attempt to encode at the original frame rate, but will end up encoding at a lower frame rate than expected due to the instability of the signal.

SUMMARY

It is therefore an objective of the present invention to provide a method for correcting for timing mismatch in an A/V stream when the above-mentioned situations occur.

With this in mind, a method for compensating for a timing mismatch in an A/V stream according to a first embodiment of the present invention is disclosed. The method comprises: providing a video encoder; receiving a plurality of encoded video frames of a current Group of Pictures (GOP) from the video encoder and a plurality of encoded audio frames; when an error occurs in the video encoder, utilizing a most recent encoded video frame of a previous GOP received from the video encoder as a reference to generate a plurality of dummy video frames; and utilizing the plurality of dummy video frames to pad the current GOP.

A method for compensating for a timing mismatch in an A/V stream according to a second embodiment of the present invention is also disclosed. The method comprises: receiving a plurality of encoded video frames and a plurality of encoded audio frames comprising a Group of Pictures (GOP); determining an error value of each video frame of the GOP; when a difference between an error value of a current frame and an error value of a previous frame is greater than a first threshold, determining an error value of the final video frame in the GOP to generate a GOP error value; when the GOP error value is greater than or equal to a second threshold, utilizing the final video frame as a reference frame to generate a plurality of dummy video frames; and utilizing the plurality of dummy video frames to pad the GOP.

These and other objectives of the present invention will no doubt become obvious to those of ordinary skill in the art after reading the following detailed description of the preferred embodiment that is illustrated in the various figures and drawings.

DETAILED DESCRIPTION

As described in the above, there are a number of situations where a timing mismatch will exist between encoded video frames and encoded audio frames, thereby resulting in a situation where a number of received video frames in a chunk are more or less than an expected number of video frames. The present invention provides a method to correct for this discrepancy by generating and inserting one or a plurality of dummy video frames, or deleting one or a plurality of frames. Inserting dummy frames can be achieved by altering certain bits in the frame header, repeating a previous frame, or inserting a specially made frame.

Many video coding standards have already defined dummy frames (P0), and those dummy frames are constructed to substitute for missing video frames, for example, MPEG-4 standard defines a VOP-coded-0 frame as a dummy frame. The dummy frame is a zero-reference frame and is a video frame that contains the content of a previous reference frame. By inserting these zero reference/dummy frames into an A/V data stream after properly calculating a timing error between the audio frames and the video frames, the timing error can be corrected.

In the first situation described above, where the video encoder aborts, all frames of the currently encoded group of pictures (GOP) should be dropped because there may be errors in the frames. Please note that the term GOP in this invention is used to represent a number of video frames, which is not limited to the GOP structure defined by the MPEG standard. As the video encoding and audio encoding operations are executed separately, encoded audio frames are still being received from the audio encoder. An embodiment of the method therefore utilizes a last reference frame (i.e. a last encoded P frame of a previous GOP) to generate a plurality of dummy video frames, and these dummy video frames replace already-multiplexed video frames of the current GOP. In addition, the video encoder is explicitly shut down then restarted. As more encoded audio frames arrive from the audio encoder, the system then multiplexes the incoming audio frames with the dummy video frames.

When it is determined that a video frame arrives from the video encoder, i.e. the encoder has started encoding once more, the current GOP is padded with dummy video frames so timing of the dummy video frames is equal to timing of the audio frames. The time duration of the dummy video frames is added to the total recording time. This completes multiplexing of the current GOP, and then normal multiplexing of a next GOP can start.

Figure 1:
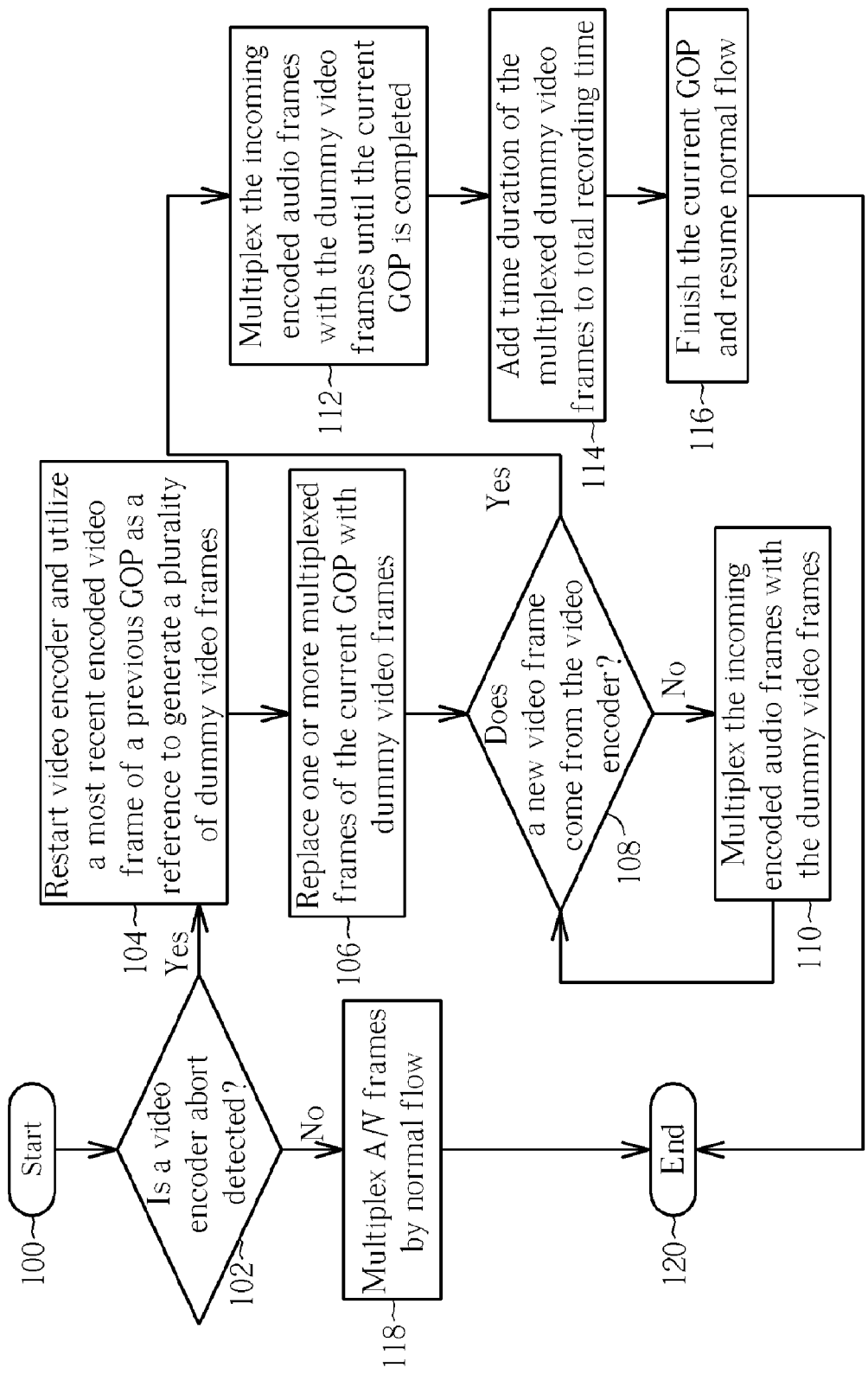
FIG. 1 is a flowchart detailing the steps of a method according to a first embodiment of the present invention.

For a clearer description of this process, please refer to FIG. 1. FIG. 1 is a flowchart detailing the steps of a method according to a first embodiment of the present invention. The steps are as follows:

Step 100: Start;
Step 102: Is a video encoder abort detected? If yes go to Step 104, if no go to Step 118;

Step 104: Restart video encoder and utilize a most recent encoded video frame of a previous GOP as a reference to generate a plurality of dummy video frames;

Step 106: Replace one or more multiplexed video frames of the current GOP with dummy video frames;

Step 108: Does a new video frame come from the video encoder? If yes go to Step 112, if no go to Step 110;

Step 110: Multiplex the incoming encoded audio frames with the dummy video frames, return to Step 108;

Step 112: Multiplex the incoming encoded audio frames with the dummy video frames until the current GOP is completed;

Step 114: Add time duration of the multiplexed dummy video frames to total recording time;

Step 116: Finish the current GOP and resume normal flow;

Step 118: Multiplex A/V frames by normal flow;

Step 120: End.

As mentioned above, a situation where a signal source is unstable, or a signal source is changed can also cause synchronization errors when multiplexing the A/V data streams. In both situations an actual time of an encoded video frame arriving from the video encoder will not be the same as an expected time. This second embodiment of the present invention also utilizes the generation of dummy video frames to correct for this error when the source provides a lower frame rate. If the video frame rate is higher than expected, some video frames are dropped to correct for this error. In some embodiments, reference frames are kept so bidirectional frames (B frames) are usually selected to be dropped.

The second embodiment calculates the time difference between the actual time of arrival of a video frame and the expected time of arrival, according to the real time a video frame comes from the encoder, and the PTS period of the television system. The equation is as follows:

$$Err_n = PTS_n + Acc\_Video\_Adjust - PTS\_Period * n \quad (1)$$

where $PTS_n$ is the real time the $n^{th}$ frame comes from the video encoder, Acc_Video_Adjust is the accumulated adjustment and is zero initially, and PTS_Period is 3003*(1/90,000) sec for an NTSC system and 3600*(1/90,000) sec for a PAL system.

When $Err_n - Err_{n-1}$ is greater than or equal to a first threshold, the system will begin error management. First all frames of the current GOP will be multiplexed by the normal flow, then an error of the final frame in the GOP (herein called a GOP error value) will be determined and compared with a second threshold. If the GOP error value is greater than this second threshold, a first dummy video frame will be inserted in the tail of the GOP. The PTS_Period is then subtracted from the GOP error value, subtracted from the Acc_Video_Adjust, and added to the total recording time. If the adjusted GOP error value is still greater than the second threshold, then a second dummy video frame will be inserted, and the PTS_Period is utilized again to adjust the GOP error value, Acc_Video_Adjust, and total recording time. This process continues until the GOP error value falls below the second threshold.

A first threshold is set to judge if the error difference between two frames is large enough for activating the error handling mechanism. For example, an accumulated error shorter than one frame duration (e.g. 1/30 seconds) cannot be compensated by adding or dropping video frames. Such kinds of small errors may be compensated by adjusting the value of the presentation time stamp (PTS).

Figure 2:
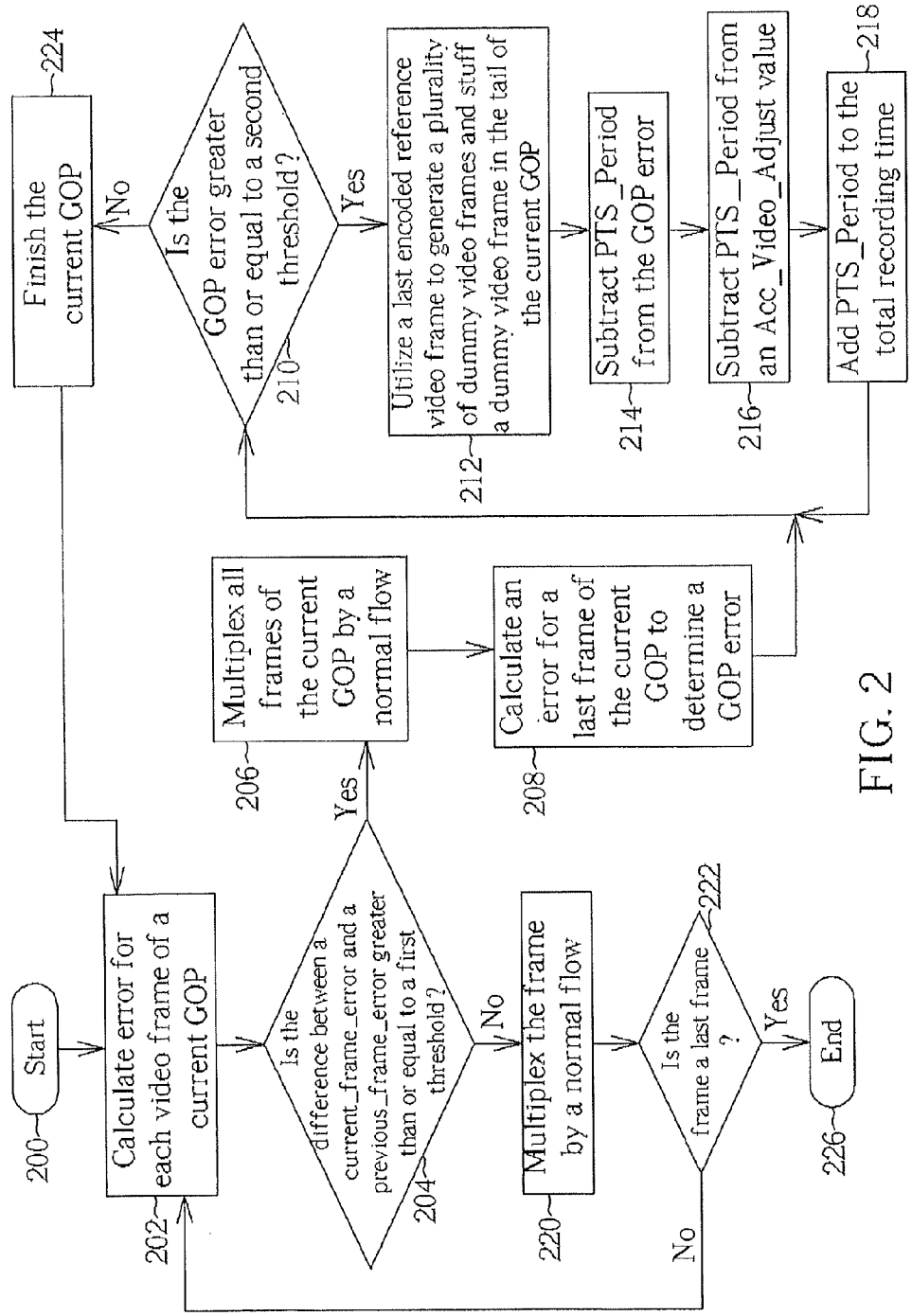
FIG. 2 is a flowchart detailing the steps of a method according to a second embodiment of the present invention.

For a clearer description of this process, please refer to FIG. 2. FIG. 2 is a flowchart detailing the steps of a method according to a second embodiment of the present invention. The steps are as follows:

Step 200: Start;

Step 202: Calculate error for each video frame of a current GOP;

Step 204: Is the difference between a current_frame_error and a previous_frame_error greater than or equal to a first threshold? If yes go to Step 206, if no go to Step 220;

Step 206: Multiplex all frames of the current GOP by a normal flow;

Step 208: Calculate an error for a last frame of the current GOP to determine a GOP error;

Step 210: Is the GOP error greater than or equal to a second threshold? If yes go to Step 212, if no go to Step 224;

Step 212: Utilize a last encoded reference video frame to generate a plurality of dummy video frames and stuff a dummy video frame in the tail of the current GOP;

Step 214: Subtract PTS_Period from the GOP error;

Step 216: Subtract PTS_Period from an Acc_Video_Adjust value;

Step 218: Add PTS_Period to the total recording time and go back to Step 210;

Step 220: Multiplex the frame by a normal flow;

Step 222: Is the frame a last frame? If yes go to Step 226, if no go back to Step 202;

Step 224: Finish the current GOP and go back to Step 202;

Step 226: End.

By creating dummy frames, a current GOP can be selectively padded according to timing mismatch between video data and audio data. Because the reference frame of the dummy video frame has already been encoded, minimal computation is required. Furthermore, the dummy video frames can be selectively padded to the GOP to correct for frame rate encoding errors. Utilization of the dummy frames to pad a GOP can therefore restore a desired frame rate.

In some other embodiments, the dummy frames may be inserted in some other positions rather than the tail of the GOP, for example, in the head of the GOP, middle of the GOP, or more than one session of the GOP.

Those skilled in the art will readily observe that numerous modifications and alterations of the device and method may be made while retaining the teachings of the invention.

What is claimed is:

1. A method for compensating for a timing mismatch in an A/V stream, the method comprising:

receiving a plurality of encoded video frames of a current Group of Pictures (GOP) from a video encoder and a plurality of encoded audio frames;

multiplexing the encoded video frames with the encoded audio frames;

when an error occurs in the video encoder, generating a plurality of dummy video frames; and utilizing the plurality of dummy video frames to replace the multiplexed video frames of the current GOP.

2. The method of claim 1, wherein the dummy video frames are generated utilizing a most recent encoded video frame of a previous GOP as a reference.

3. The method of claim 1, further comprising:

restarting the video encoder when the error occurs;

multiplexing the encoded audio frames and the dummy video frames; and when a next encoded video frame is received from the restarted video encoder, continuing multiplexing the encoded audio frames with the dummy video frames to complete the current GOP.

4. The method of claim 3, further comprising:
adding a time duration of the padded dummy video frames to a recording time of the A/V stream.

5. The method of claim 1, wherein the dummy video frame is generated by altering bits of a frame header.

6. A method for compensating for a timing mismatch in an A/V stream, the method comprising:
receiving a plurality of encoded video frames of a Group of Pictures (GOP) and a plurality of encoded audio frames;
determining an error value of each video frame of the GOP, wherein the error value is time difference between an actual time of arrival of a video frame and an expected time of arrival;
when a difference between an error value of a current frame and an error value of a previous frame is greater than a first threshold, determining an error value of a last video frame in the GOP to generate a GOP error value;
when the GOP error value is greater than or equal to a second threshold, generating a dummy video frame; and
utilizing the dummy video frame to pad the GOP.

7. The method of claim 6, wherein the dummy video frame is generated utilizing the last video frame as a reference frame.

8. The method of claim 6, wherein the GOP error value is determined by comparing an actual time of the last video frame with an expected time, the expected time determined according to an expected frame rate.

9. The method of claim 6, wherein the step of utilizing the dummy video frame to pad the GOP comprises:
inserting a dummy video frame in the tail of the GOP;
adjusting the GOP error value according to the inserted dummy video frame;
comparing the adjusted GOP error value with the second threshold; and
when the adjusted GOP error value is greater than the second threshold, repeating the above steps until the adjusted GOP error value is less than the second threshold.

10. The method of claim 9 wherein the encoded video frames and encoded audio frames are received in a television (TV) system and the step of adjusting the GOP error value according to the inserted dummy video frame comprises:
subtracting a PTS_Period of the TV system from the GOP error value.

11. The method of claim 6, wherein the encoded video frames and encoded audio frames are received in a television (TV) system and the step of determining an error value of each video frame of the GOP is determined by:

$PTS_n + Acc\_Video\_Adjust - PTS\_Period * n;$ wherein $PTS_n$ is the real time of encoding of the video frame, $Acc\_Video\_Adjust$ is an accumulated adjustment value, and $PTS\_Period$ is the PTS period of the TV system.

* * * * *